United States Patent [19]

Vorotyntseva et al.

[11] 4,363,987

[45] Dec. 14, 1982

[54] DIRECT CURRENT MACHINE STATOR

[76] Inventors: Ljudmila A. Vorotyntseva, ulitsa Njutona, 141, kv. 30; Eduard A. Florinsky, ulitsa 12 Aprelya, 6, kv. 13; Leonid I. Semenkov, ulitsa Geroev Truda, 54, kv. 16; Valentin S. Sysoev, ulitsa Geroev Truda, 37, kv. 60, all of Kharkov, U.S.S.R.

[21] Appl. No.: 233,600

[22] PCT Filed: Jun. 4, 1980

[86] PCT No.: PCT/SU80100099

§ 371 Date: Feb. 4, 1981

§ 102(e) Date: Feb. 3, 1981

[87] PCT Pub. No.: WO80/02777

PCT Pub. Date: Dec. 11, 1980

[30] Foreign Application Priority Data

Jun. 4, 1979 [SU] U.S.S.R. .............................. 2774554

[51] Int. Cl.³ .......................................... H02K 1/00
[52] U.S. Cl. .................................... 310/216; 310/254; 310/258

[58] Field of Search ................................. 310/216–218, 310/254, 258, 259, 89, 91

[56] References Cited

U.S. PATENT DOCUMENTS

| 3,200,275 | 8/1968 | Lindgren | 310/258 X |
| 3,320,451 | 5/1967 | Wiley | 310/216 X |
| 3,809,938 | 5/1974 | Sjoberg et al. | 310/254 |
| 4,102,040 | 7/1978 | Rich | 310/216 X |
| 4,255,684 | 3/1981 | Mischler | 310/259 |

*Primary Examiner*—Donovan F. Duggan
*Attorney, Agent, or Firm*—Lilling & Greenspan

[57] ABSTRACT

Stator of a direct current electrical machine comprises a support structure (1) defined by a pair of frame members (4) and beams (2), the latter being disposed around the center line (3) of the stator with the ends thereof affixed to the frame members (4), and a magnetic circuit (7) having a yoke (8) and pole pieces (9 and 10) secured to the yoke (8). The yoke is in the form of a single continuous band coiled into a cylindrical spiral, each turn of the spiral embracing by a wider side thereof all the beams (2) of the support structure (1).

2 Claims, 7 Drawing Figures

DIRECT CURRENT MACHINE STATOR

TECHNICAL FIELD

The present invention relates to electrical engineering, and more particularly to stators of direct current electrical machines.

BACKGROUND ART

Modern technological advances call for the availability of fast response drives incorporating direct current electrical machines capable of providing variations in the rate of the armature current in excess of 30 nominal values per second, as well as featuring high reliability and high specific characteristics in combination with minimal overall size and weight. Accordingly, this dictates higher structural requirements to the stators of direct current electrical machines, viz. laminated magnetic circuits and optimal utilization of the interior at preset overall dimensions.

Known in the art is a direct current machine stator (cf. British Pat. No. 1,432,700; Cl. H 02 K 1/18; published 1976) comprising a stator support having beams arranged around the center line of the stator, a magnetic circuit incorporating a laminated stator ring or yoke adapted to receive the stator support beams, and pole pieces attached to the yoke. The yoke of the magnetic circuit is assembled bz means of pins from separate L-shaped steel segments or plates disposed lingitudinally of the center line of the stator, whereas the stator support further comprises cross beams welded to the longitudinal beams, the yoke being positioned essentially inside the stator support structure.

However, a disadvantage of this stator construction resides in that large amounts of costly material, such as magnetic steel, are required for the manufacture of the yoke due to irrationally arranged pattern or tailoring thereof.

Also, manual stacking the L-shaped plates into a yoke is a labour consuming operation preventing a mechanized manufacture of the stator, which results in an inferior quality and reduced production efficiency.

DISCLOSURE OF THE INVENTION

The present invention is directed towards the provision of a direct current machine stator incorporating such a structural arrangement of a yoke as to permit an increase in the overall power of the machine, improve the reliability of the stator, raise the production efficiency, reduce the amount of materials consumed in the manufacture and ensure high rates of current variations in the armature.

This is attained by that in a direct current machine stator comprising a support structure having beams disposed around the longitudinal center line of the stator, a magnetic circuit incorporating a yoke adapted to cooperate with support beams, and pole pieces affixed to the yoke, according to the invention, the yoke is in the form of a continuous band coiled into a cylindrical roll or spiral with each turn of the spiral embracing by a wider side thereof all the support beams, the support structure further comprising a pair of frame members positioned at the bases of the cylindrical spiral and having the support beam ends secured thereto.

Preferably, at least one support frame is provided with at least one aperture.

The present invention affords to have the stator manufacture mechanized and automated.

Also, the invention permits to obtain the optimum configuration of the stator thereby enabling an increase in the overall power of the machine at preset size and weight requirements.

BRIEF DESCRIPTION OF THE DRAWINGS

The invention will now be described in greater detail with reference to a specific embodiment thereof taken in conjunction with the accompanying drawings, in which.

BEST MODE OF CARRYING OUT THE INVENTION

Figure 1:
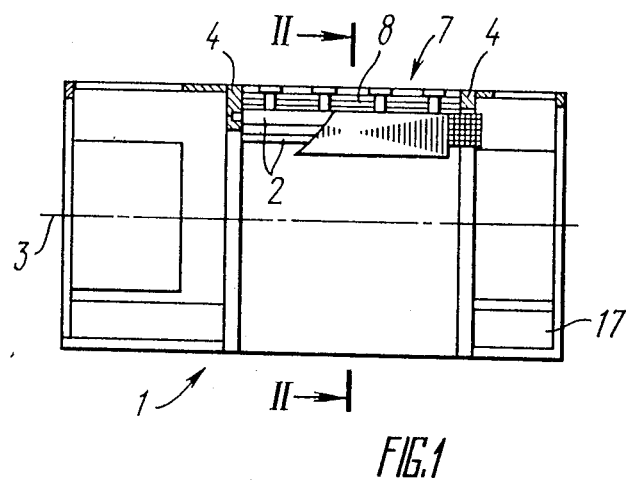
FIG. 1 is a stepped longitudinal section of a direct current machine stator according to the invention.
Figure 2:
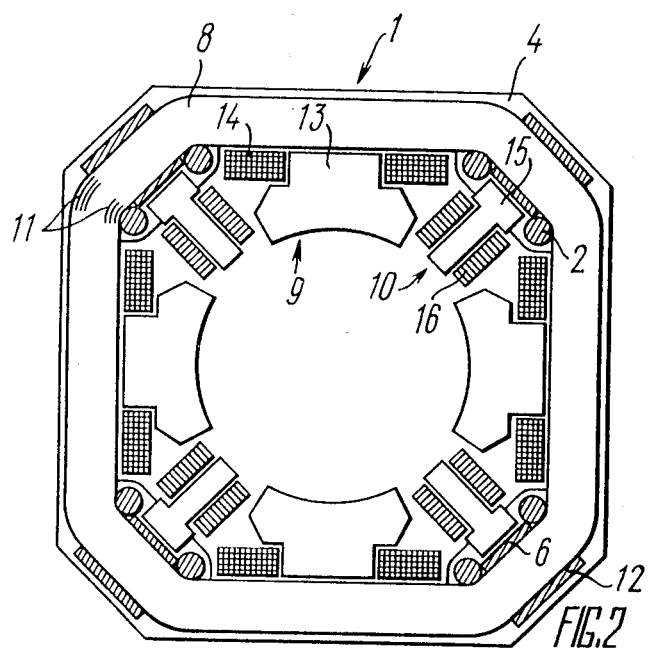
FIG. 2 shows a cross-section on the line II—II in FIG. 1.

Stator of a direct current electrical machine comprises a support structure 1 (FIGS. 1 and 2) defined by four pairs of beams 2 disposed around a longitudinal center line 3 of the stator, and two frame members 4. Ends of the beams 2 are received into openings 5 (FIGS. 3 and 4) provided in the frame members 4 and welded to these frame members 4. For improved rigidity of the support structure 1 (FIGS. 2, 4 and 5) a plate 6 is secured between each pair of the beams 2. The stator further comprises a magnetic circuit 7 (FIG. 1) incorporating a yoke 8 with end sides thereof accommodating the frames 4 of the support structure 1, and pole pieces 9 and 10 (FIG. 2). The yoke 8 is in the form of a polyhedron and made up of a continuous band 11 coiled into a cylindrical spiral. Each turn of the spiral embraces by a wider surface thereof all the beams 2 of the support structure 1. Attached to each narrow outer side of the yoke 8 is a plate 12. Each of the pole pieces 9 and 10 comprises respectively a core element 13 having an exitation winding 14 and a core element 15 having a winding 16 intended for compensating a reactive electromotive force arising during operation of the machine. Affixed to the frame members 4 (FIG. 1) are spaces or boxes 17.

Figure 6:
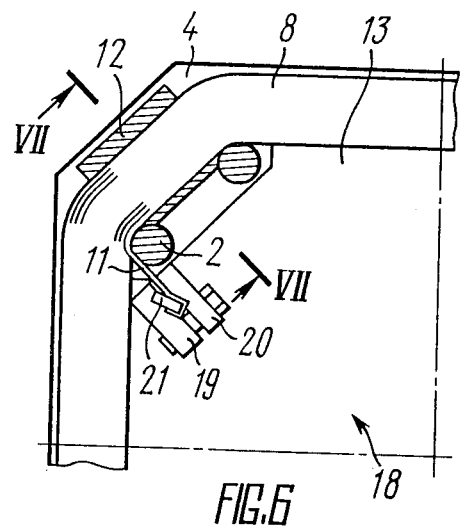
FIG. 6 illustrates a fastening assembly of the starting portion of a band material of the stator according to the invention.

Represented in FIG. 6 is an assembly 18 for fastening the starting portion of the band stock 11. The assembly 18 further comprises screw clamps 19 and 20 connected therebetween and a bar 21 having the starting portion of the band stock 11 crimped therearound.

Figure 7:
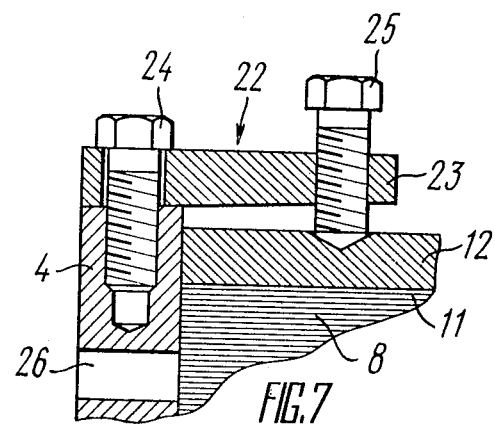
FIG. 7 shows a section on the line VII—VIII in FIG. 6.

With reference to FIG. 7, there is shown an assembly 22 for fastening the end portion of the band stock 11 comprising a plate 23 attached to the frame member 4 by a screw bolt 24.

Received through a threaded opening in the plate 23 is a holding bolt 25 for holding by means of the plate 12 the end portion of the band 11 defining the yoke 8. For monitoring the tightness of the coiled band 11 (FIG. 2)

wound around the beams 2 there are provided apertures 26 (FIGS. 3 and 7) in the frame members 4.

The stator of a direct current electrical machine is assembled in the following manner.

Figure 3:
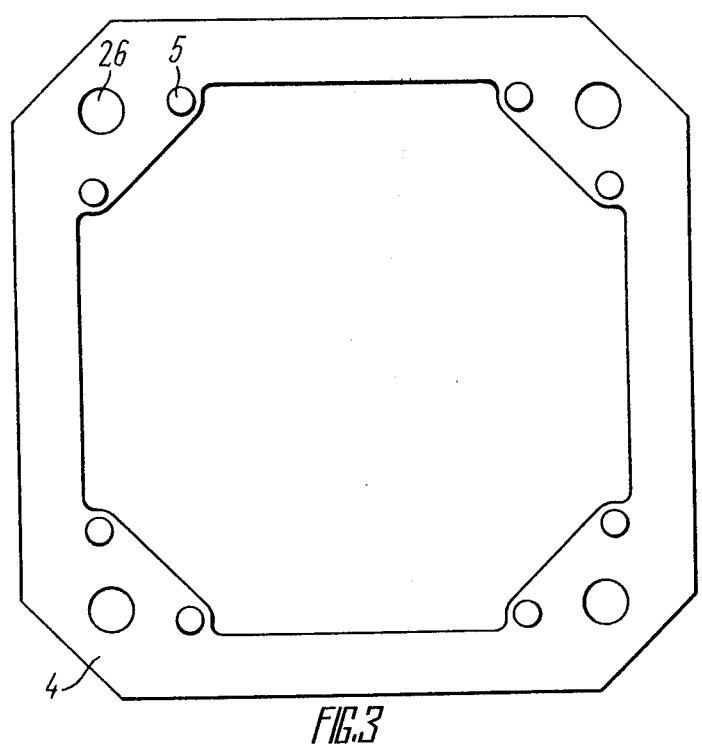
FIG. 3 is a general view of a frame member of the stator according to the invention.
Figure 4:
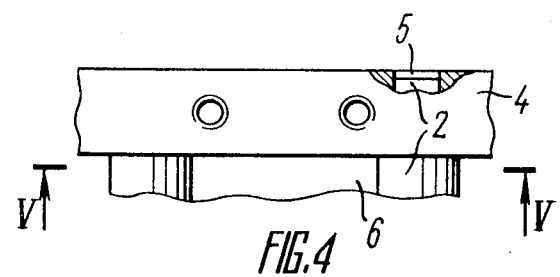
FIG. 4 is a partial view of a support structure according to the invention, a partially cut-away representation.
Figure 5:
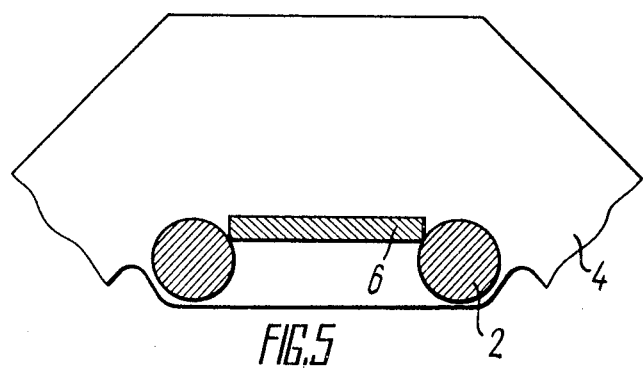
FIG. 5 shows a section on the line V—V in FIG. 4.

Assembled first is the support structure 1 (FIGS. 1, 2, 3 and 4). The beams 2 are inserted into the openings 5 of the frames 4 and welded thereto. This is accompanied by securing the plates 6 (FIGS. 2, 4 and 5) to the beams 2 and the narrow sides of the frame members 4. After completing the assembly of the support structure 1, the starting portion of the band 11 is fixed between the screw clamps 19 and 20 (FIG. 6) and crimped around the bar 21. Thereafter, the band 11 is coiled into a cylindrical spiral around the beams 2 of the support structure 1 thereby obtaining the yoke 8. Tight winding of the coils is controlled through the apertures 26 (FIGS. 3 and 7). The end portion of the band 11 is held in position by means of the plate 23 and the holding bolt 25 acting to fix the end portion of the band 11 through the plate 12. Thereupon, excess of the starting and end portions of the band 11 is cut-off to be followed by removing the screw clamps 19 and 20 (FIG. 6), bar 21, plates 23 (FIG. 7), bolts 24 and 25. The core elements 13 and 15 of the pole pieces 9 and 10 respectively are then secured to the inner side of the thus obtained yoke 8 (FIG. 2) with mounted on the core elements windings 14 and 16.

In view of the foregoing, the present invention makes it possible to reduce material waste during manufacture of the stator according to the invention, which enables to improve the efficiency of utilization of the materials consumed to 95%.

INDUSTRIAL APPLICABILITY

This invention can be advantageously applied in various fields of the national economy, such as metallurgical, paper-making and machine-building industries.

We claim:

1. A direct current electrical machine stator comprising a support structure having beams disposed around the longitudinal center line of the stator, a magnetic circuit incorporating a yoke adapted to cooperate with support beams, and pole pieces affixed to the yoke, characterized in that the yoke (8) is in the form of a continuous band coiled into a cylindrical spiral with each turn of the spiral embracing by a wider side thereof all the support beams (2) of the support structure (1), the support structure (1) further comprising a pair of frame members (4) positioned at the bases of the cylindrical spiral and having ends of the support beams (2) of the support structure (1) secured thereto.

2. A stator as claimed in claim 1, characterized in that at least one frame member (4) of the support structure (1) is provided with at least one aperture (26).

* * * * *